D. NETTENSTROM.
POWER TRANSMISSION MECHANISM.
APPLICATION FILED APR. 3, 1911.

1,056,292.

Patented Mar. 18, 1913.

2 SHEETS—SHEET 2.

Witnesses:
P. J. Gathmann
Robt. M. Burton

Inventor:
David Nettenstrom
By Burton & Burton
Attorneys

UNITED STATES PATENT OFFICE.

DAVID NETTENSTROM, OF CHICAGO, ILLINOIS, ASSIGNOR OF ONE-HALF TO CHARLES H. EDER, OF CHICAGO, ILLINOIS.

POWER-TRANSMISSION MECHANISM.

1,056,292.  Specification of Letters Patent.  Patented Mar. 18, 1913.

Application filed April 3, 1911. Serial No. 618,678.

*To all whom it may concern:*

Be it known that I, DAVID NETTENSTROM, a citizen of the United States, residing at Chicago, in the county of Cook and State of Illinois, have invented new and useful Improvements in Power-Transmission Mechanism, of which the following is a specification, reference being had to the accompanying drawings, forming a part thereof.

The purpose of this invention is to provide an improved mechanism for power transmission mechanism, particularly adapted for use where sudden variation of speed or load, and also ready reversal of direction must be provided for.

It consists of the features and elements shown and described as indicated in the claims.

Figure 1:
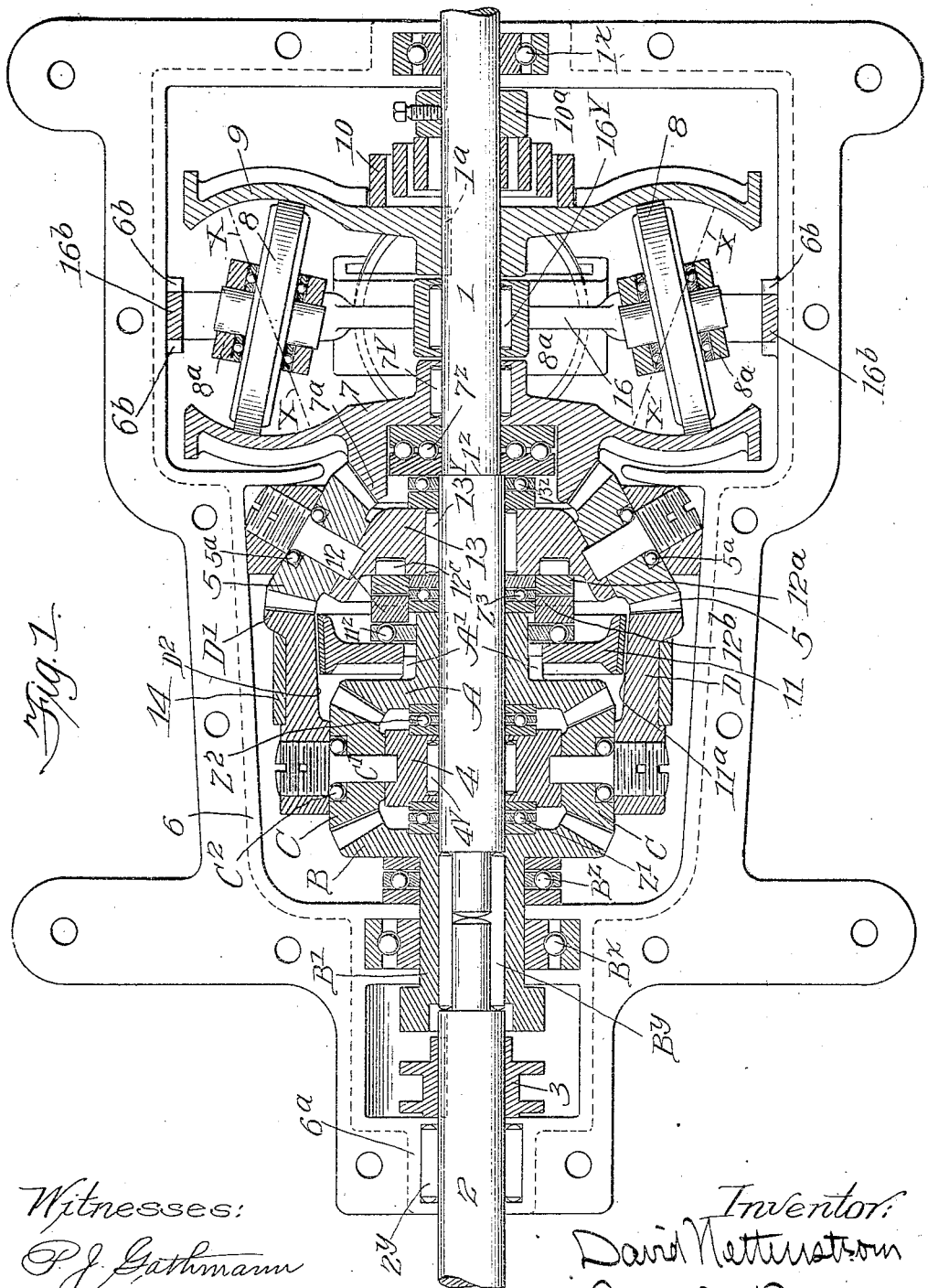
Figure 2:
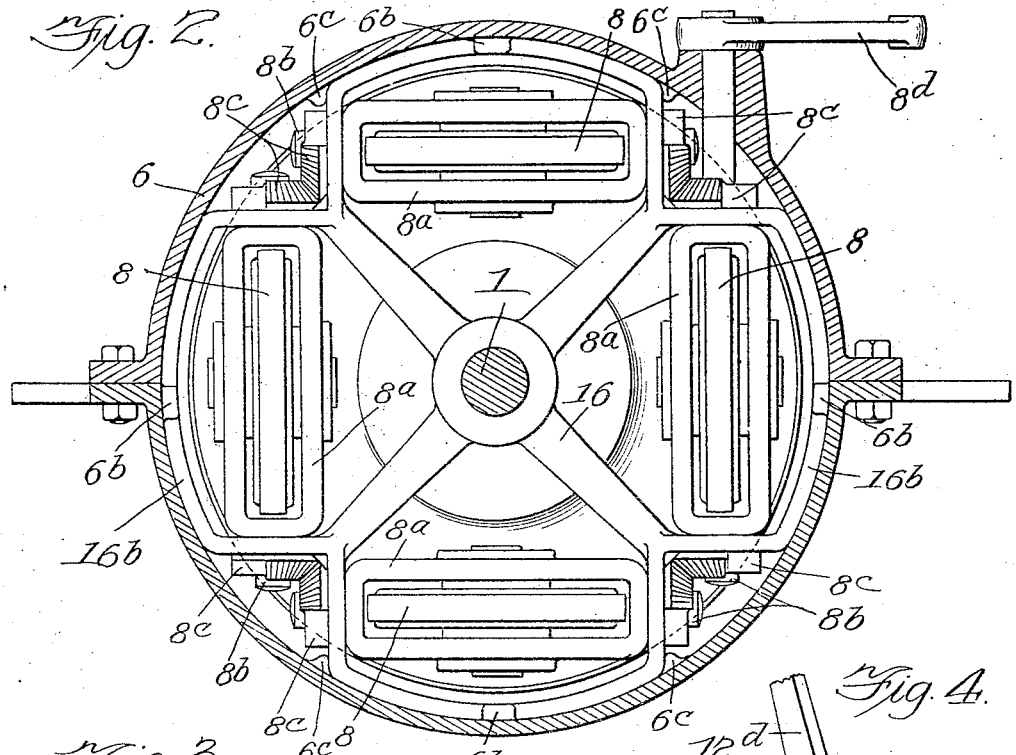
Figures 3, 4:
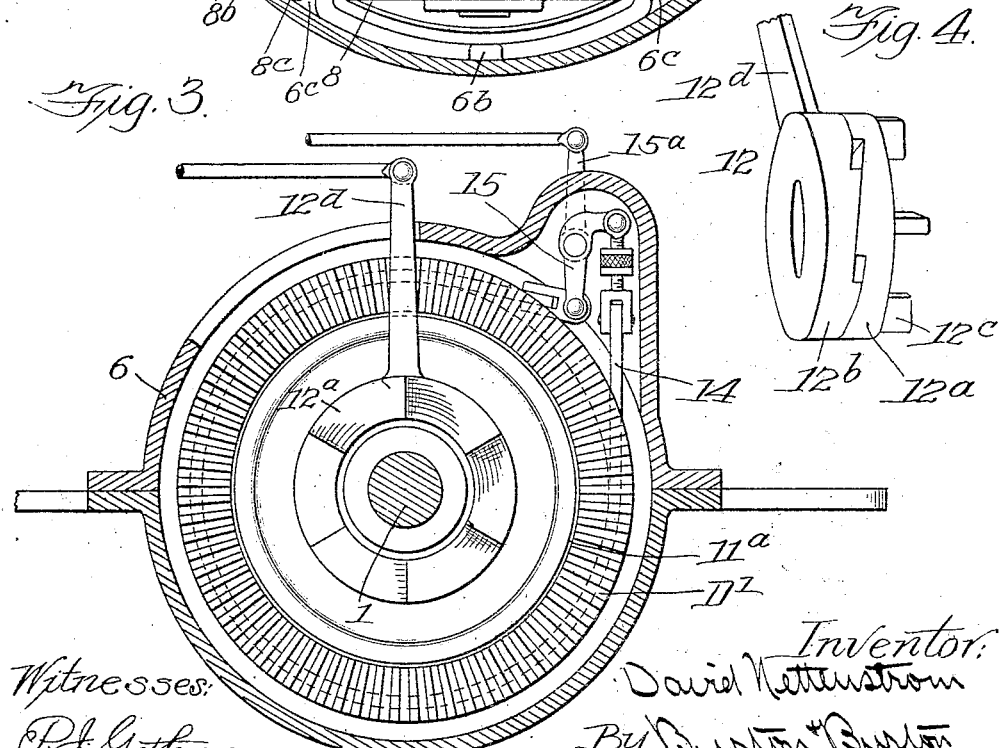

In the drawings: Figure 1 is an axial section of a gear train and its mountings, embodying this invention. Fig. 2 is a detail elevation of a detached portion of the structure comprising a fixed bridge and friction idler wheels journaled therein. Fig. 3 is a sectional view showing in elevation the gear, $D^1$, and the actuating arms for the clutch, 12, and brake band, 14. Fig. 4 is a detail of a clutch shifting device.

The operation of this device may be most readily understood by the consideration of the well known laws governing the operation of "differential" gear train. Referring to Fig. 1, the "differential" gear train contained in this particular transmission mechanism consists of the driving wheel, A, the driven wheel, B, and the beveled gear idlers, C, connecting them. The driving gear wheel, A, is keyed rigidly to the extended portion, 1, of the engine shaft, while the driven gear, B, is adapted for operative connection with the driven shaft, 2, by means of a sliding jaw clutch, 3, or any other suitable connection. The idlers, C, are journaled between a drum, D, and a hub, 4, loosely mounted on the shaft, 1. One end of the cylindrical drum, D, has cut upon it a crown gear, $D^1$, meshing with bevel gears, 5, journaled fixedly in the casing, 6, and operatively connecting the said drum, D, with a gear, $7^a$, formed on the friction disk, 7. The disk, 7, is carried loosely upon the shaft, 1, and is adapted to be rotated through the operation of the friction idler wheels, 8, which contact with an opposite and similar disk, 9, secured to the shaft, 1, by means of the feather, $1^a$, and held in contact with the idler wheels by a spring, 10, which reacts against an adjustable collar, $10^a$ on the shaft. Considering now, the differential gear train, composed of the elements, A, B, C, and D, it is well known that if the drum, D, be held stationary while the shaft, 1, is revolved in a given direction, the result will be a rotation of the gear wheel, B, at a speed equal to that of the gear wheel, A, but in the opposite direction. It will also be seen that if the drum, D, be revolved at the same annular velocity and in the same direction as the shaft, 1, the result will be no differential motion whatever between the gear, A, and the idlers, C, the elements, A, C, and D, acting merely as a jaw clutch to drive the gear, B, in the same direction and at the same velocity with themselves. The third condition which may be considered, is that in which the gear, B, is held stationary while the shaft, 1, and its rigid gear wheel, A, are revolved and in which case the result is a revolution of the drum, D, in the same direction as the shaft, 1, but at one-half its angular velocity. Conversely the rotation of the drum, D, in the same direction as the shaft, 1, but at one-half its angular velocity would result in no rotation of the gear, B.

In the present invention, the foregoing well known principles have been applied to accomplish the gradual variation of the speed of the driven shaft, 2, from zero up to the speed of the driving shaft, 1, with a possibility of even a higher speed than that of the driving shaft, together with the opportunity for reversing the direction of rotation of the shaft, 2, and of varying its speed in such reverse direction. Briefly this is accomplished by varying the speed of the drum, D, the latter being driven through a variable speed friction transmission mechanism from the driving shaft, 1.

With the idler wheel, 8, set as shown in Fig. 1, the friction disk, 7, would obviously run at a speed somewhat lower than that of the disk, 9, and this speed would be further reduced through the gear, 7ª, idlers, 5, and crown gear, D¹, with the result that the angular velocity of the drum, D, would be just one-half that of the friction disk, 9, and its driving shaft, 1. Remembering that the gear, A, is keyed fast to the driving shaft, 1, it will be seen that with the parts in this position, the third of the three conditions above recited would be present, that is, the driven gear, B, would remain stationary. If the idler wheels, 8, be turned to the position indicated by line, X—X, on Fig. 1, it is obvious that the disk, 7, would revolve at a speed somewhat greater than that of the disk, 9, but owing to the particular proportions of the gears, 7ª, and D¹, this gain of angular velocity is just neutralized by the said gears so that the angular velocity of the gear, D¹, and its drum, D, is reduced to a value just equal to the angular velocity of the disk, 9, and its driving shaft, 1. The direction of rotation having been twice reversed, the drum, D, will rotate in the same direction as the driving shaft. 1. The gear, A, being rigid with the shaft, 1, and consequently revolving with it, it may be seen that the resulting condition is that of the second case above recited, that is, the parts, A, C, and D, will act together as a jaw clutch for driving the gear, B, with them at the same velocity and in the same direction. Since this position of the train would probably be the most used, it is found convenient to provide an auxiliary clutch, 11, carried on short feathers, A¹, projecting from the hub of the gear, A, and provided with a cone face, 11ª, adapted to frictionally engage the interior surface, D², of the drum, D. Thus, when the condition of equal velocity of the driving shaft, 1, and the driven shaft, 2, has been attained, it may be maintained by throwing into service this clutch which connects the drum, D, more or less positively to the shaft, 1, and relieves the friction disks and idlers of any driving strain. The engagement of the clutch, 11, with the drum, D, is effected through a partial rotation of one of the elements of the shifting device, 12, shown in detail in Fig. 4 and which consists of the two annular elements, 12ª and 12ᵇ, the former of which is rendered stationary with the casing, 6, by means of its lugs, 12ᶜ, projecting into the hub, 13, which serves as a partial support for the idlers, 5. The opposing faces of the annular elements, 12ª and 12ᵇ, respectively, are formed with coöperating projections, resembling ratchet teeth, by virtue of which the thickness of the said elements varies from point to point about their circumferences. With these opposing faces in contact, a slight rotation of the element, 12ᵇ, with respect to the element, 12ª, will cause the former to move a short distance along the shaft, 1, and by such movement to force the cone clutch, 11, into engagement with the drum, D. A rocker arm, 12ᵈ, extending radially from the element, 12ᵇ, is adapted for connection with any suitable operating means which might be arranged for actuation automatically, as soon as the idler wheels, 8, were brought into the position indicated by the line, X—X, or which could be arranged for actuation at will, if preferred. It will be understood that the range of movement of the rocker arm, 12ᵈ, would not exceed the angular extent of one of the ratchet-like projections on the face of the annulus, 12ᵇ. The clutch, 11, would be released by returning the rocker arm, 12ᵈ, to its original position, viz: that shown in full lines in Fig. 3. With this support removed, the clutch would readily slip out of engagement with the drum, as soon as the friction wheels, 8, were moved to a position which would cause the drum, D, and the gear, A, to be driven at different speeds.

As the idler wheels, 8, are turned from their position at the line, X—X, to the neutral position in which they are shown in full lines in Fig. 1, the speed of the driven shaft, 2, will gradually be decreased from the speed of the engine shaft down to zero, in which instance the drum will be revolving with one-half the angular velocity of the engine shaft and in the same direction. If the idler wheels, 8, be turned still further and past this neutral position, the speed of the drum, D, will gradually be decreased still further with a resulting rotation of the driven shaft, 2, in the opposite direction and at a gradually increasing rate. If, as the velocity of the drum, D, approached zero, it should be clamped and held stationary, the first of the three above recited conditions would obtain in the differential gear train and the driven shaft, 2, would revolve at the same speed as the driving shaft, 1, but in the opposite direction. In the use for which this transmission is primarily designed, namely, for use in self-propelled vehicles, this condition would not often obtain, since it would hardly ever be desired to drive the vehicle backward at as high a rate of speed as would result in this case. However, since the reduction of the speed of the driven shaft, 2, from a value equal to the speed of the driving shaft, 1, down to the value of zero, is obtained by reducing the speed of the drum, D, the brake band, 14, positioned about the drum, D, becomes a very effective instrument for reducing the speed of the driven shaft, 2, and (in the case of an automobile) for bringing the vehicle to a stop, since it serves to rapidly reduce the speed of the drum, D, to a value of one-half the speed of the engine shaft 1, and even lower than this, if it be found necessary to reverse the driving wheel of the vehicle in order to bring it to rest more promptly. This brake band, 14, is shown as of the usual construction with its ends connected respectively to the two arms of the bell crank lever, 15, provided with an operating arm, 15$^a$, and any suitable operating connections not shown.

Fig. 2, illustrates the particular arrangement of parts by which the friction idlers 8 are supported within the casing. The four armed spider 16, having an interrupted rim formed by the portions 16$^b$, furnishes support for these idler wheels. Between the consecutive arms of the spider, there are mounted carriers 8$^a$ connected to the spider arms by short swivel shafts, 8$^b$, which are each provided with segmental bevel gears 8$^c$. These gear segments are positioned so as to mesh in pairs, and in this way, since the swivel shafts are tight in their respective carriers 8$^a$, any rotation of one of the carriers about its swivel axis, causes a similar rotation of all the carriers. One of the swivel shafts is sufficiently elongated to extend outside the casing and has a rocker arm 8$^d$, designed for connection with any convenient form of operating means. The lugs 6$^b$, formed on the inner surface of the casing retain the rim portion of the spider against axial movement, and the lugs 6$^c$, prevent it from slipping circumferentially within the casing. In order to minimize as far as possible the losses due to friction in this power transmission, all bearing and wearing surfaces are provided with ball or roller bearings of the usual types. The shaft 1, is provided at its entrance to the case 6, with a ball bearing 1$^x$ of the annular type, while the spider 16, the friction disk 7, stationary hub member, 13, the hub 4 and the elongated hub B$^1$, of the driven gear B, are each provided with sets of roller bearings indicated respectively at 16$^y$, 7$^y$, 13$^y$, 4$^y$, and B$^y$. This last mentioned roller bearing serves also for the abutting end of the driven shaft 2 for which there is also shown another set of roller bearings 2$^y$ carried in an extended portion 6$^a$ of the casing.

Annular ball bearings B$^x$ journal the driven gear B, and a thrust bearing B$^z$, is interposed between this gear and the casing, in order to take up axial thrust, which is incident to all such differential gearing. In connection with the differential gear train there are also provided thrust bearings, $z^1$, $z^2$ and $z^3$, the first two of which act also as spacers for causing the gears to mesh properly. The ball thrust plate 11$^z$, is interposed between the clutch 11 and the clutch shifter 12 to minimize the friction of these parts, resulting when the clutch is thrown into operative position by the shifter. The heavy thrust which results from the action of the spring 10, forcing the friction disks 7 and 9 into driving contact with the idler wheels 8 is prevented from passing along the shaft beyond the disk 7 by a double thrust bearing 7$^z$ interposed between the rear face of the hub of the disk 7, and the shoulder 1$^z$ formed on the shaft. The remaining thrust bearing is located between the hub 13 and one plate of the bearing 7$^z$, as shown at 13$^z$. The bevel idlers C, are journaled on short studs C$^1$, provided each with a set of balls C$^2$ which receive the thrust resulting from the well known action of bevel gears. Exactly similar bearings are shown at 5$^a$ in connection with the idler gears 5. The friction wheel idlers 8 are mounted in plain bearings but are set between ball thrust bearings, since there is considerable side strain on the idlers, as they are turned from one position to another about their swivel shafts 8$^b$.

I claim:—

1. A power transmission mechanism, comprising a driving and a driven shaft, a differential gear train connecting said shafts, a carrier for the idler gears of said train mounted for rotation about the common axis of the initial and final gears, a disk secured to the driving shaft, a second and similar disk loosely mounted upon said shaft, positive direction-reversing connections between the carrier and said loosely mounted disk, speed-varying, direction-reversing connections between the two disks, and a clutch adapted for connecting the carrier directly with the driving shaft.

2. A power transmission mechanism, comprising a driving and a driven shaft, a differential gear train connecting said shafts, a carrier for the idler gears of said train mounted for rotation about the common axis of the initial and final gears, and a variable speed transmission gearing, comprising a pair of disks, one of which is mounted for rotation with the driving shaft, the other being loose thereon and operatively connected with the carrier, and adjustable friction wheels mounted between the opposing faces of the disks, in contact therewith and including in range of adjustment a position for revolving the carrier at one half the rate of revolution of the driving shaft.

3. A power transmission mechanism, comprising a driving and a driven shaft, a differential gear train connecting said shafts, a carrier for the idler gears of said train mounted for rotation about the common axis of the initial and final gears, a disk mounted on the driving shaft for rotation therewith, a second disk journaled loosely thereon, positive speed-reducing connections between the second disk and the carrier, and frictional speed-varying devices between the two disks, the speed-reducing connections being so proportioned that the adjustment of the speed-varying connections shall accomplish a variation in the speed of the carrier, ranging from a value less than half of the rate of revolution of the driving shaft up to a value greater than the said rate of revolution of the driving shaft.

In testimony whereof I have hereunto set my hand at Chicago, Illinois, this 1st day of April, 1911.

DAVID NETTENSTROM.

Witnesses:
 LUCY I. STONE,
 M. GERTRUDE ADY.